Patented May 27, 1952

2,597,987

UNITED STATES PATENT OFFICE 2,597,987

HEAT AND LIGHT STABILIZED VINYL RESINS AND COMPOSITIONS THEREOF

James Harding, Bound Brook, N. J., assignor to Union Carbide and Carbon Corporation, a corporation of New York No Drawing. Application March 24, 1950, Serial No. 151,827

7 Claims. (Cl. 260—45.7)

This invention relates to the stabilization of vinyl resins containing combined chlorine, from the degradation effects of exposure to heat and light.

Vinyl chloride resins can be directly prepared by the individual polymerization of vinyl chloride monomer or by copolymerization with a non-halogen containing vinyl monomer such as vinyl acetate. More particularly, the invention is concerned with the stabilization of vinyl chloride-vinyl acetate copolymer resins such as are described in U. S. Patent No. 1,935,577 to E. W. Reid.

It is well known that vinyl chloride resins are highly sensitive to the effect of heat, particularly heat of the degree required to soften the resins allowing them to be shaped into a desired form as by molding, pressing or extruding. The effect of heat on the normally colorless transparency of these vinyl resins is to darken and eventually opacify the resins. The color change proceeds through shades of yellow, deepens to ambers and brown and finally becomes a blackened char.

The effect of exposing vinyl chloride resins to sunlight or artificial light of which a substantial amount is in the ultra-violet region is also one of discoloration, although the rate of change is much slower than with heat discoloration. Moreover, the color change is less drastic and is principally observed in the development of brown spots and in many instances by yellowing.

The incorporation of various bases and salts in these vinyl resins has been proposed to stabilize or minimize the effects of light and heat. Usually a given base or salt is more effective for one of these purposes than for the other. For example, the organo-metallic tin salts of carboxylic acids as described in the Yngve Patent 2,307,092 or the hydrocarbon tin salts of alpha-beta olefinic carboxylic acids as described in the Quattlebaum et al. Patent 2,307,157, are highly effective in stabilizing chlorine-containing vinyl resins against exposure to heat, but, for many applications of these vinyl resins, do not impart adequate resistance to discoloration by sunlight. On the other hand, zinc or cadmium salts are known to have good light stabilizing properties, but are practically worthless for heat stabilization.

The expedient of employing both a known heat stabilizer and a known light stabilizer in a vinyl resin is not always practical because of interfering effects by one stabilizer on the other, resulting in either poorer heat or color stability than would be normally obtained in the absence of the second stabilizer. Furthermore, a mixture of stabilizers may destroy the normal transparency of these vinyl resins and yield cloudy or opaque mixtures due to their incompatibility with each other or with the vinyl resins.

One of the objects of the present invention is the conjoint heat and light stabilization of vinyl chloride polymers or copolymers.

Another object is the heat and light stabilization of these vinyl resins with retention of their normal transparency.

These and other objects as will be apparent are attained by incorporating in vinyl chloride resins an adequate content of a tin salt of an organic carboxylic acid and from 0.5 to 10.0 parts by weight, per 100 parts of resin, of a neutral or basic substantially water-insoluble salt of magnesium and an inorganic acid such as carbonic acid, ortho or meta silicic acid, or a phosphoric acid such as ortho phosphoric acid or pyro phosphoric acid. Either the anhydrous or hydrous forms of these salts may be employed.

The magnesium salts, as defined above, due to their water-insolubility, are substantially immune to leaching by water and hence are retained in the vinyl resin when it is subjected to water exposure. This is of particular importance when the resin is shaped into film form for use as shower curtains and other end uses involving direct contact with water. Additionally, by selecting magnesium salts having a refractive index between 1.50 and 1.54 their presence is not ordinarily visible in the vinyl chloride or vinyl chloride-vinyl acetate copolymer resins which have a refractive index in the range between 1.51 and 1.53. Accordingly, when these salts are finely dispersed in the vinyl chloride resins in the amount required for color stabilization, their presence is not readily detected by unaided normal vision when the resin is in sheet form of less than 0.50 inch.

Among the specific magnesium salts having utility for the purposes of this invention are the following:

| | Refractive Index |
|---|---|
| Phosphates: | |
| Trimagnesium phosphate, $Mg_3(PO_4)_2 \cdot 5H_2O$ | 1.524 |
| Magnesium ortho-phosphate, $Mg_3(PO_4)_2$ | 1.51–1.54 |
| Carbonates: | |
| Basic magnesium carbonate, $3MgCO_3 \cdot MgOH_2 \cdot 3H_2O$ | 1.527–1.540 |
| Hydrous magnesium carbonate, $MgCO_3 \cdot 3H_2O$ | 1.495–1.526 |
| Silicates: | |
| Magnesium silicate, $MgO \cdot 2.5SiO_2 \cdot H_2O$ | 1.47–1.53 |
| Sepiolite, $2MgO \cdot 3SiO_2 \cdot 2H_2O$ | 1.50–1.53 |

Other magnesium salts having a refractive index outside of the preferred range of 1.50 to 1.54 when employed in optimum amounts for light stabilization tend to opacify the colorless vinyl chloride resins. Such salts include anisotropic varieties of anhydrous magnesium carbonate having a refractive index of 1.717 and 1.51; the silicates such as talc having a refractive index of 1.589 and forsterite having a refractive index of 1.651.

The tin salts of organic carboxylic salts which are useful in conjunction with the magnesium salts for conjoint light and heat stabilization are any of the tin salts described and contemplated by the aforementioned Yngve Patent 2,307,092 and the Quattlebaum et al. Patent 2,307,157. Specific representatives of such salts are dibutyl tin diacetate, dibutyl tin dioleate, diphenyl tin distearate, dibutyl tin dilaureate, dibutyl tin maleate, dibutyl tin fumarate and tri-(dibutyl tin) diaconitate.

The utility of the two types of stabilizers (inorganic magnesium salt and organic tin salt) in vinyl resins containing bound chlorine was practically determined by testing vinyl resin compositions containing various amounts of the stabilizers. Two types of test procedures were used to evaluate the performance of the compositions.

One test procedure determined heat-stability on 0.040 inch thick samples prepared by hot-milling the vinyl resin and the stabilizers to form an intimate dispersion. Such samples were placed in an oven thermostatically controlled to a constant temperature of 158° C. At half hour intervals, a sample was removed, and the change of color, if any, was measured on an integrating sphere type of photometer using a blue glass filter (Wratten C-5) for emphasis of the yellowing.

The light stability tests were run on similar size specimens, with the specimens being exposed out of doors at Miami, Florida, until a change from the original color value of the specimen was observed. In most instances, a water-clear sample eventually changes to a decided yellow and often contains limited areas or spots of a deep amber or brown color. Failure is regarded to have taken place when the decided yellow appearance has developed or when the brown spots have become so numerous and large as to cover the major portion of the sample. The duration of exposure time to observable failure is reported in sun hours. By the term sun hours, there is meant the time during which the sun intensity exceeds 0.823 gram calories per square centimeter per minute, as measured by an Epply pyrheliometer. At the above location, there are on the average 130 sun hours per month or 1500 per year.

The superiority of the joint presence of the two types of stabilizers in vinyl chloride polymers over either stabilizer alone, or of tin salts in admixture with salts of metals other than magnesium is clearly evident from inspection of the data herewith submitted in tabular form. To reduce the variables to a minimum, for comparative analysis, the tests hereinafter set forth in Tables I and II were made with a specific vinyl chloride polymer, namely a copolymer of vinyl chloride and vinyl acetate having the approximate composition by weight of 96% vinyl chloride and 4% vinyl acetate and an intrinsic viscosity in the range 0.925 to 1.007 when measured in nitrobenzene. Test samples were prepared by hot milling at about 130°–150° C. compositions having the following base formula, all parts or percentages being by weight.

```
                                                      Parts
Vinyl chloride-vinyl acetate copolymer
  resin _____ 60.5–62.5
Dioctyl phthalate (plasticizer)_____ 35.0
Stearic acid (lubricant)_____ 0.5
Tin salt (heat stabilizer)_____0.0 to 3.0
Magnesium salt _____ 1.0
```

*Table I*

| Sample | Heat Stabilizer | Light Stabilizer | Light Stabilization, Total sun hours before failure | Heat Stabilization, per cent light transmission after heating at 158° C. for hours indicated— | | | |
|---|---|---|---|---|---|---|---|
| | | | | 0 | 1 | 2 | 3 |
| A | 2.0% dibutyl tin dilaurate. | None | 750 | 80 | 62 | 60 | 5 |
| B | ___do___ | 1% basic magnesium carbonate. | Slight spotting at 1,500. | 80 | 55 | 38 | 12 |
| C | 1.0% dibutyl tin maleate. | None | 750 | 82 | 78 | 78 | 72 |
| D | ___do___ | 1% basic magnesium carbonate. | Slight spotting at 1,500. | 82 | 80 | 80 | 79 |
| E | ___do___ | 1.0% trimagnesium phosphate. | No change at 1,000. | 80 | 79 | 79 | 70 |
| F | ___do___ | 1.0% magnesium silicate. | No change at 750. | 78 | 57 | 43 | 10 |
| G | 1.5% dibutyl tin dilaurate. | None | 500 | 80 | 50 | ¹ 10 | |
| H | ___do___ | 1.0% magnesium silicate. | 750 | 77 | 35 | 9 | |
| I | ___do___ | 1.0% trimagnesium phosphate. | No change at 1,000. | 85 | 84 | 72 | 10 |

¹ at 1.5 hours.

The trimagnesium phosphate used in the specific samples had the formula $$Mg_3(PO_4)_2 \cdot 5H_2O$$

the basic carbonate was $3MgCO_3 \cdot Mg(OH)_2 \cdot 3H_2O$ and the silicate was essentially $MgO \cdot 2.5SiO_2 \cdot H_2O$.

Inspection of Table I shows that the copresence of a magnesium salt with a suitable organic tin salt in a vinyl chloride polymer materially improves the polymers resistance to discoloration by sunlight, but without appreciable change to the resistance to heat decomposition normally imparted by the presence of the tin salt alone.

This effect is considered unique in that other known stabilizers for vinyl chloride resins which impart resistance to sunlight, such as the salts of zinc or cadmium detrimentally affect the heat-stability values normally to be expected from the presence of an organic tin salt.

On the other hand, the magnesium salts in the presence of other conventional heat stabilizers such as basic lead silicate or di-sodium monohydrogen phosphate exhibit anomalous behavior. In some cases, they decrease the vinyl chloride polymer's normal resistance to sunlight, in other they behave practically as inert substances, and at best impart only a slight increase in the polymers resistance to sunlight, and in general significantly impair the resistance to heat.

In Table II there is reported the light and heat-stability properties of vinyl chloride resin compositions containing various magnesium salts as light stabilizer and a conventional heat stabilizer other than a tin salt. The samples were made with the same vinyl resin, lubricant and plasticizer, and in the same manner as described for the samples reported in Table I.

*Table II*

| Sample | Heat Stabilizer | Light Stabilizer | Light Stabilization, Total sun hours before failure | Heat Stabilization, percent light transmission after heating at 158° C. for hours indicated— | | | |
|---|---|---|---|---|---|---|---|
| | | | | 0 | 1 | 2 | 3 |
| J | 2% basic lead silicate. | None | 500 | 78 | 78 | 77 | 76 |
| K | ___do___ | 1% trimagnesium phosphate. | 500 | 55 | 50 | 40 | 25 |
| L | ___do___ | 1% magnesium silicate. | 250 | 62 | 40 | 40 | 38 |
| M | 3% proprietary product by analysis 60% di-sodium mono-hydrogen phosphate, 40% inert filler. | None | 500 | 70 | 62 | 58 | 55 |
| N | ___do___ | 1% trimagnesium phosphate. | 750 | 65 | 58 | 53 | 45 |
| O | ___do___ | 1% magnesium silicate. | 750 | 57 | 18 | ¹ 9 | |

¹ 1.5 hours.

Inspection of Table II shows that the various magnesium salts exhibit at most a neutral and occasionally an injurious effect with respect to the heat-stability imparted by the conventional heat-stabilizers. The light stability results reveal anomalous results, in one instance (sample L) a decidedly poorer value was obtained. At best, however, color failure was evident in all samples after 750 hours of sun exposure. In contrast thereto the magnesium salts in combination with tin salts of organic carboxylic acids consistently exhibited superior light stabilization, including values up to 1500 hours before visible changes occurred.

The stabilizing agents comprising the described tin salts and magnesium salts may be incorporated with vinyl resins containing bound chlorine by various methods well known to the art, including milling, or by adding the stabilizer to solutions of the resins in volatile solvents, and subsequently removing the solvent as by evaporation.

The quantity of tin salt ordinarily required for effective heat stabilization ranges from about 0.5 to 5.0 per cent by weight of the vinyl resin, with about 1 to 2 per cent generally yielding optimum results with respect to cost of stabilizer versus stabilization effect. The magnesium salts are and probably will be considerably cheaper than the tin salts and hence can be economically employed in considerable amounts. At about 10.0 parts per 100 parts by weight of vinyl resin, however, the magnesium salts tend to reduce the per cent light transmission to a measurable degree for some uses. For example, a vinyl chloride-vinyl copolymer with no magnesium salt was found to have 78% light transmission; with 2% trimagnesium phosphate that value was 73%; with 5% of the phosphate the transmission value was 63%, and with 10% phosphate, the per cent light transmission drops to 50%. The minimum amount of magnesium salt for observable improvement in color stabilization is about 0.5% on the weight of the vinyl resin.

Vinyl resins containing bound chlorine and the two stabilizers comprising an organic tin salt and suitable magnesium salt may be compounded in conventional manner with fillers, lubricants, pigments, and plasticizers in the formulation of molding compounds, extrusion compounds, coatings and adhesives exhibiting superior resistance to the effects of heat and light.

What is claimed is:

1. Resinous composition comprising a vinyl chloride resin having a refractive index value between 1.51 and 1.53 and dispersed in said resin as a heat-stabilizer therefor a hydrocarbon tin salt of a carboxylic acid, and as a light-stabilizer therefor a salt of magnesium having a refractive index between 1.50 and 1.54 and selected from the group consisting of the phosphates, carbonates and silicates.

2. Resinous composition comprising a vinyl chloride-vinyl acetate copolymer resin and dispersed in said resin as a heat-stabilizer therefor a hydrocarbon tin salt of a carboxylic acid, and as a light-stabilizer therefor basic magnesium carbonate.

3. Resinous composition comprising a vinyl chloride-vinyl acetate copolymer resin and dispersed in said resin as a heat-stabilizer therefor a hydrocarbon tin salt of a carboxylic acid, and as a light-stabilizer therefor trimagnesium phosphate.

4. Resinous composition comprising a vinyl chloride-vinyl acetate copolymer resin and dispersed in said resin as a heat-stabilizer dibutyl tin maleate, and as a light stabilizer basic magnesium carbonate.

5. A heat and light stabilized composition comprising a vinyl chloride resin of a refractive index between 1.51 and 1.53 and having dispersed therein a hydrocarbon tin salt of a carboxylic acid in amount between 0.5 and 5.0 per cent on the weight of the vinyl resin, and a magnesium salt selected from the group consisting of the phosphates, carbonates and silicates, said magnesium salt having a refractive index between 1.50 and 1.54 and being present in amount between about 0.5 and 10.0 per cent on the weight of the vinyl resin.

6. A heat and light stable composition of a vinyl chloride resin and dispersed in said resin a light-stabilizer selected from the group consisting of alkyl tin salts and aryl tin salts and a heat-stabilizer of a salt of magnesium selected from the group consisting of the phosphates, carbonates and silicates.

7. A heat and light stable composition of a vinyl chloride resin and dispersed in said resin a hydrocarbon tin salt of a carboxylic acid and a salt of magnesium selected from the group consisting of the phosphates, carbonates and silicates.

JAMES HARDING.

REFERENCES CITED

The following references are of record in the file of this patent:

UNITED STATES PATENTS

| Number | Name | Date |
| --- | --- | --- |
| 2,046,986 | Winkelmann | July 7, 1936 |
| 2,307,092 | Yngve | Jan. 5, 1943 |
| 2,307,157 | Quattlebaum | Jan. 5, 1943 |
| 2,364,410 | Whittaker | Dec. 5, 1944 |